United States Patent [19]
Roberti

[11] 3,963,546
[45] June 15, 1976

[54] METHOD OF MAKING A MULTIPLE PLY WOOD ARTICLE

[76] Inventor: Barney Roberti, Mathews Run Road, Youngsville, Pa. 16371

[22] Filed: Mar. 25, 1976

[21] Appl. No.: 561,750

Related U.S. Application Data

[62] Division of Ser. No. 488,327, July 15, 1974.

[52] U.S. Cl. .................... 156/69; 138/156; 144/309 J; 144/315 A; 156/85; 156/187; 156/189; 156/218; 156/293; 156/466; 428/36

[51] Int. Cl.² .................... B29C 27/00

[58] Field of Search .................... 156/63, 218, 294, 466, 156/69, 85; 138/156; 428/35, 36; 144/309 J, 315 A

[56] References Cited

UNITED STATES PATENTS

| | | | |
|---|---|---|---|
| 1,438,858 | 12/1922 | Rey | 156/294 |
| 1,657,280 | 1/1928 | Proctor | 144/322 |
| 1,855,041 | 4/1932 | Bodony | 156/218 |
| 2,312,333 | 3/1943 | Gramelspacher | 156/218 |
| 2,350,271 | 5/1944 | Braloff | 156/218 |
| 3,388,730 | 6/1968 | Moore | 156/294 |

*Primary Examiner*—Edward G. Whitby
*Attorney, Agent, or Firm*—Arnold B. Silverman

[57] ABSTRACT

A multiple ply wood article having a first wood veneer ply defining a generally tubular shape, which may be generally cylindrical, with a pair of confronting ends providing a first seam. A second wood veneer ply defining a generally tubular shape generally similar to the shape of the first wood veneer ply with a pair of confronting ends providing a second seam. The second wood veneer ply being disposed exteriorly of the first wood veneer ply in general surface to surface adjacency. The grain orientations of the first and second wood veneer plies being oriented generally parallel with respect to each other. Adhesive means securing the wood veneer plies to establish a multiple ply tubular body. The first and second seams are preferably in generally relative nonaligned position. Additional wood veneer plies having similar structural features may be secured over the first two plies. Closure elements may be secured to one or both ends of the tubular body in order to establish a container.

A method of manufacturing the multiple ply wood article described above including preforming the first and second wood veneer plies into the desired general shape, applying adhesive to at least one of the two surfaces to be bonded and securing the two plies in surface to surface adjacency with the grains being oriented generally parallel. Additional plies may be preformed and simultaneously or sequentially bonded to create additional plies in the tubular body.

10 Claims, 9 Drawing Figures

FIG. 6.
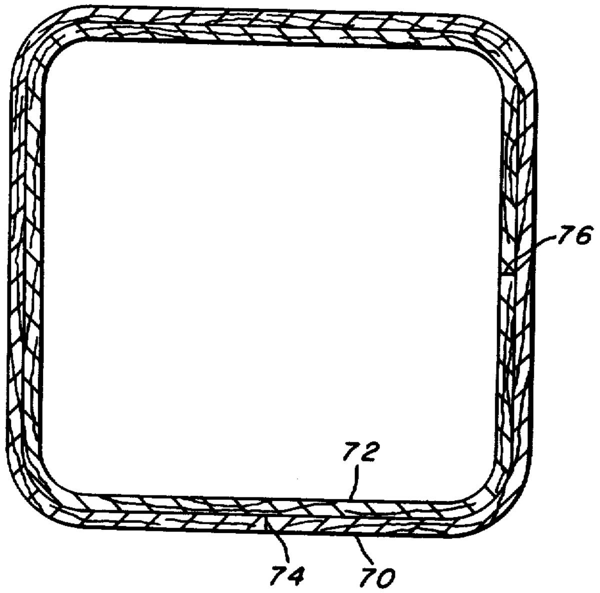
FIG. 7.
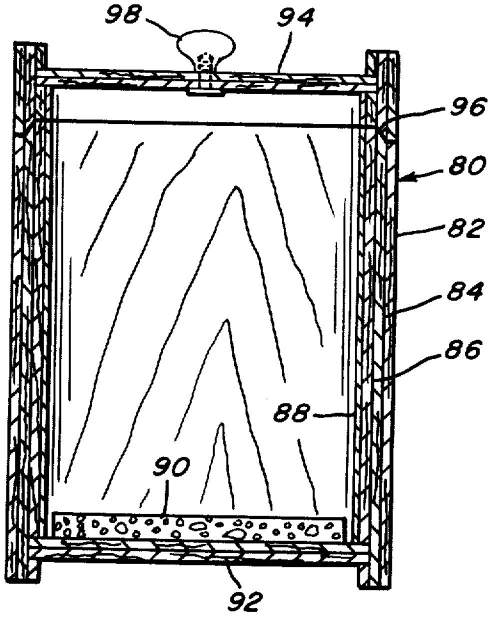
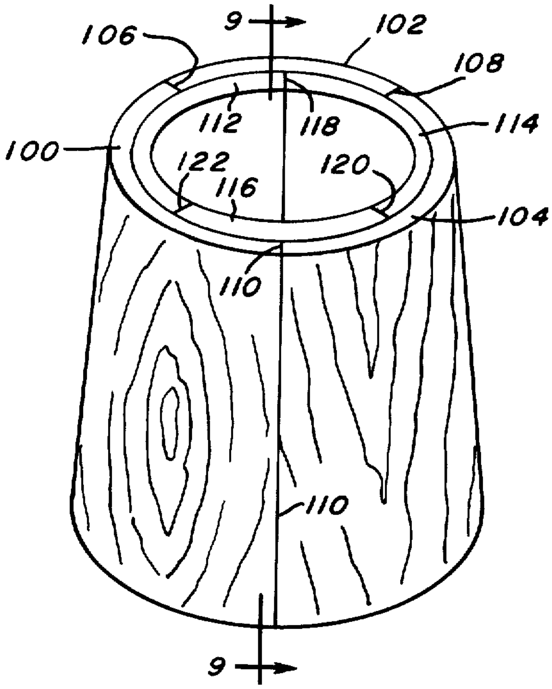
FIG. 8.
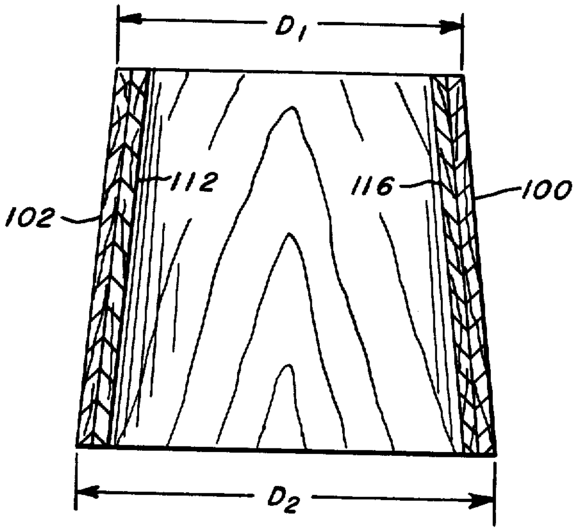
FIG. 9.

METHOD OF MAKING A MULTIPLE PLY WOOD ARTICLE

This application is a division of application Ser. No. 488,327, filed July 15, 1974.

BACKGROUND OF THE INVENTION

1. Field of the Invention

This invention relates generally to multiple ply wood veneer composite articles having successive plies adhesively bonded to each other with the wood grain of the plies oriented generally parallel to each other.

2. Description of the Prior Art

The formation of multipiece wood articles of various configurations and for various purposes including tubular configurations and container type uses has been known for many decades. Illustrative of such prior art knowledge are the following U.S. Pat. Nos. 1,293,208; 2,267,888; 2,291,426; 2,296,781; 2,334,619; 2,719,808; and 3,437,547.

Among the problems experienced in connection with joining single layer wood pieces or employing single wood pieces or constructing tubular wooden articles out of a single thickness is the difficulty in forming a relatively thick single piece of wood. Also, such constructions are frequently subject to warpage, possess inadequate strength and are extremely difficult to form in small diameters. U.S. Pat. No. 1,293,208 illustrates an elongated tubular wooden article requiring the use of a number of single layer circumferential wood segments in order to establish a circumferentially continuous article.

It has also long been known to create multiple ply wood elements consisting of a number of wooden layers adhesively bonded to each other with adjacent layers having their grain orientations essentially perpendicular to each other. This has been found to increase the strength of the composite article. Typical of such prior art usages are the common plywood and the form of barrel shown in U.S. Pat. No. 2,267,888.

It has also been known to provide for composite structures by spirally winding or convolutely winding individual plies in such a fashion that adjacent plies are angularly disposed with respect to each other. See generally U.S. Pat. Nos. 2,296,781 and 2,334,619. As a result of the difficulty encountered in forming these prior art constructions to the desired configuration in a reliable, repeatable fashion, coupled with the uneconomic aspects of certain forms of prior constructions, the use of wood in tubular articles of various types, including containers, has been diminishing through the years and other materials including glass, plastic, various forms of paperboards and metals used solely or in combination have, to a substantial extent, displaced the use of wood in such articles. This is true in spite of the fact that wood provides both aesthetic and functional benefits as contrasted with some of these other materials. There remains, therefore, a need for a tubular article composed of multiple ply wood elements which may be economically produced and will perform effectively in terms of both aesthetic and functional considerations.

SUMMARY OF THE INVENTION

The multiple ply wood article of the present invention has met the above-described needs. First and second wood veneer plies have confronting ends and define a generally tubular shape with the grain of the respective plies being generally parallel in orientation. Adhesive means secure the adjacent plies in surface to surface adjacency with the seams defined by the confronting ends preferably being in nonaligned position. As a result of the predetermined grain orientation, improved ease of forming a wide variety of desired shapes is provided without requiring auxiliary means such as cross grain orientations in order to improve strength characteristics. The multi-ply tubular body preferably has the grain orientations of the respective plies being within about 20° of each other.

If desired for container use, closure elements may be secured to one or both ends of the tubular body. For reusable types of containers, one closure may be nondestructively removed and subsequently restored to the container.

In the method of the present invention the wood veneer plies are separately preformed to the desired generally tubular shape and are subsequently assembled in face to face adjacency with the grain orientations being substantially parallel. Adhesive means are employed to establish the tubular body. If desired, closures may be provided for one or both ends of the tubular body in order to establish a container construction. For such usages wherein the container will be reused, one closure should be adapted for nondestructive removal.

It is an object of the present invention to provide a multiple ply wood veneer article having accurately reproduced desired configurations with the grain orientations of the respective plies being generally parallel to each other.

It is a further object of this invention to provide such a product and a method of making the same wherein a wide variety of shapes of tubular articles and containers may be created economically and with great reliability in terms of consistency, multiple production and maintenance.

It is yet a further object of this invention to provide a strong container and method of producing the same which will resist warpage, resist deterioration under the influence of moisture and will be usable for a wide variety of purposes.

These and other objects of the invention will be more fully understood from the following description of the invention, on reference to the illustrations appended hereto.

DESCRIPTION OF THE DRAWINGS

FIG. 6 is a plan view similar to FIG. 2 but showing a tubular article having a generally square outer periphery. FIG. 7 is a vertical cross sectional illustration of another form of container of this invention.

FIG. 8 is a partially schematic perspective view of a form of the invention wherein one end of the article has a greater diameter than the other.

FIG. 9 is a vertical cross sectional illustration of the article of FIG. 8, taken through 9—9.

DESCRIPTION OF THE PREFERRED EMBODIMENTS

Figure 1:
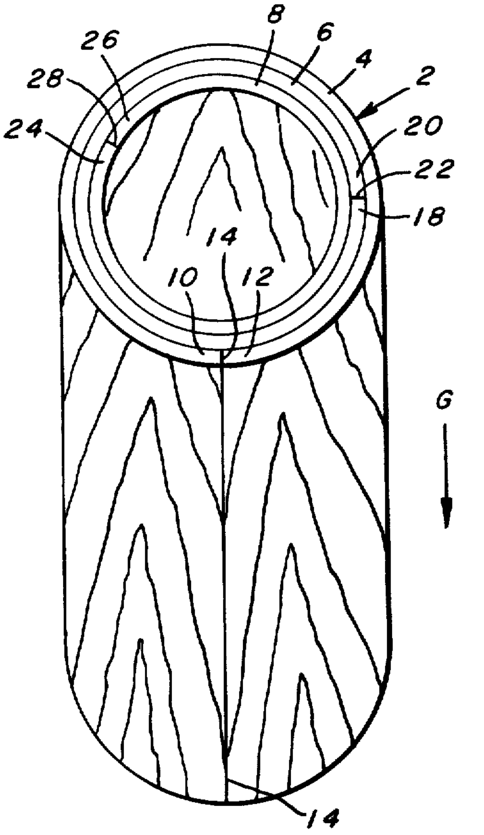
FIG. 1 is a partially schematic perspective view of one form of multiple ply wood article of the present invention.

Referring now more specifically to FIG. 1, there is shown a tubular article 2 composed of three wood veneer plies 4, 6, 8 which are adhesively bonded in surface to surface adjacency with respect to each other. Outer ply 4 has a pair of confronting ends 10, 12 which provide first seam 14. Similarly, intermediate wood veneer ply 6 has confronting ends 18, 20 which cooperate to define seam 22. Finally, inner wood veneer ply 8 has confronting ends 24, 26 which cooperate to define seam 28. It is noted that in the preferred embodiments of the invention the seams 14, 22, 28 will be positioned in relative nonaligned relationship with respect to each other. This serves to increase the strength of the composite structure and reduces the likelihood of leakage through the wall of tubular article 2.

Figure 2:
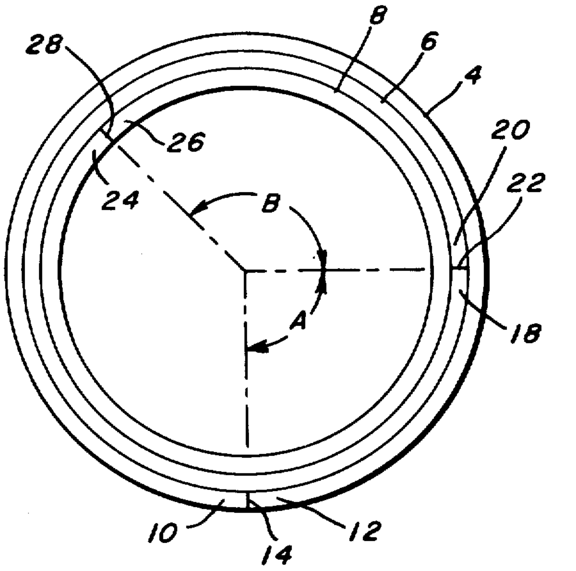
FIG. 2 is a plan view of the tubular article shown in FIG. 1.

Referring more specifically to FIGS. 1 and 2, it is noted that the grain of the wood in veneer ply 4 is oriented in the direction indicated by the arrow G. This is a direction essentially the same as the longitudinal axis of the tubular article 2. While it is not shown in this view, the grain orientation of the plies 6 and 8 will be generally parallel to the grain orientation G of outer ply 4. The respective grain orientations of the wood veneer plies are preferably such that the smaller included angle between them is less than about 20°.

While as has been shown in FIG. 2, the seams 14, 22, 28 are disposed circumferentially relatively far from each other, it will be appreciated that they may be positioned relatively close to each other, if desired. For example, angle A could conveniently be 10°, 90°, 120°or 200°. The same is true of angle B.

The various wood of plies 4, 6, 8 may be composed of a wide range of materials. Among those preferred for most uses are woods selected from the group consisting of maple, walnut, ash, poplar, cherry, oak, mahogany, pine and birch. If desired, for economic reasons or other reasons, the species of wood employed may be different for different plies. For example, an aesthetically pleasing, relatively expensive specie may be employed in the outer layer, with less expensive wood being employed in the inner ply, or plies. Among the preferred thicknesses of each wood veneer ply are about 1/32 to 5/16 inch. In general, the smaller the diameter of a cylindrical tubular article to be produced the thinner the veneer plies which will be used.

Figure 3:
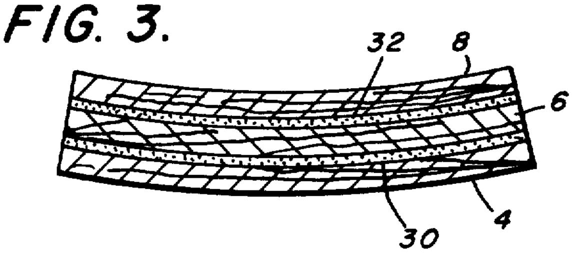
FIG. 3 is a fragmentary partially schematic enlarged view of the article shown in FIGS. 1 and 2.

Referring now to FIG. 3, there is illustrated a fragmentary portion of the wall of tubular article 2. It is noted that interposed between wood veneer ply 4 and wood veneer ply 6 is a layer of adhesive means 30 (shown slightly enlarged for clarity of illustration). Similarly, interposed between wood veneer ply 6 and wood veneer ply 8 is a layer of adhesive means 32 (shown enlarged). The adhesive means is preferably provided in a substantially continuous layer so as to continuously bond the adjacent veneer plies. The adhesive means 30, 32 is preferably provided in a thickness of about 1% to 10% of the average thickness of the adjacent wood veneer plies. While the particular adhesive means selected will frequently depend upon the intended end use, it is generally preferred to employ a water resisting or waterproof adhesive which will effectively prevent loss of bonding or loss of tubular article wall integrity during storage, handling and use in a wide range of environments over a wide range of time. If desired, a disbursant may be provided in the adhesive to increase the strength of the resultant article. One particularly suitable adhesive is that marketed under the designation "CL-8800 Fast Curing Resin Emulsion (Type II Bond)" sold by National Casein. This is a water solvent type adhesive and is particularly suited to bonding porous and semi-porous materials and has a viscosity of about 3500–4500 cps at 78°F which makes it easy to apply. Among the other suitable adhesives are those sold under the trademarks "Gulf L-100 Formaldehyde Resin" and "Melamine MB-330".

In general, the method of the present invention contemplates individual preforming of the wood veneer plies into generally tubular shapes having a pair of confronting ends and each having the grain oriented generally in a first direction. Adhesive is applied to at least one of the two surfaces which will be secured in general surface to surface adjacency and the preformed wood veneer plies are positioned in the surface to surface adjacency with the grains oriented in generally parallel relationship. The adhesive means are then employed to secure the assembly into a firmly bonded tubular article.

A specific example of how the method may be practiced will now be considered. Four wood veneer plies having a thickness of about ⅛ inch are dried to a moisture content of about 6 to 8%. The veneer elements have been precut to about $\theta$ inch greater length and width than is ultimately desired. The veneer is submerged in hot water at about 200° to 250° for about 1 minute to 10 minutes in order to make the material flexible. The wood veneer plies are then wrapped around an appropriate form in order to establish the desired generally tubular shape. While wrapped around the form an appropriate amount of tension is applied to the ply and sufficient heat is applied to cause the wood to shrink and restore the original moisture content of about 6 to 8%. After a period of about 1 to 10 minutes the veneer plies are removed from the form and the shape will be held. In creating the desired configuration of each successive veneer ply consideration is given to the very slight amount of space which will be occupied by the glue which secures the successive layers to each other. After removing the veneer from the forms it is inserted in a jig and cut to the right circumferential size. The veneer plies are then covered with a continuous coating of the glue and installed in a jig which will secure the relative plies in the desired fixed position. Internal support is provided during the bonding process. This can be accomplished by means of an air bag or another source of hydraulic expansion pressure which will assert a force of about 1 to 1500 pounds per square inch. One advantage of the hydraulic approach is that it will permit a heating unit to be installed in its expansion mechanism in order to accelerate drying of the adhesive. If an air bag is employed, the heating apparatus may be incorporated in the outside mechanism of the jig. When the multiple ply wood veneer tubular is removed from the jig, it is permitted to dry thoroughly for 24 hours before trimming, sanding, painting, printing or any other desired post-treatment, including branding.

Examples of dimensions of tubular articles which may readily be made with the present invention would be a tube of the above-described character having a cylindrical configuration and a 1 inch external diameter with a 4 inch height. Tubular articles having a 6 inch diameter and 8 inch height have been made equally effectively with the present invention. Larger diameters and heights may be also readily manufactured. In general, it will be preferred to employ the thinner veneers for the smaller diameter articles in order to improve ease of forming characteristics.

Figure 4:
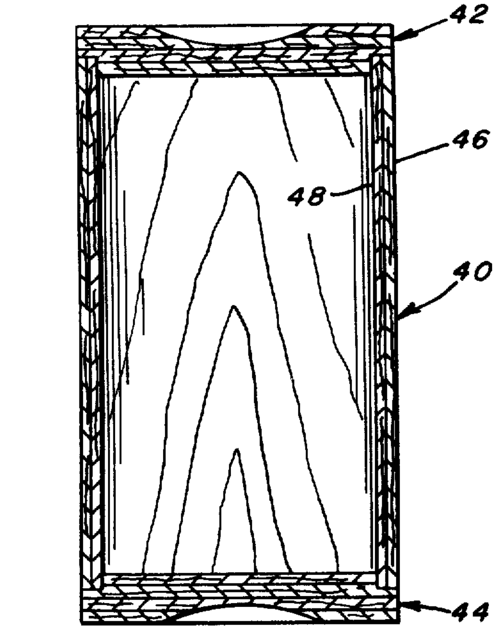
FIG. 4 is a vertical cross sectional illustration of a cylindrical container of the present invention.

Referring now to FIG. 4, an embodiment of the present invention wherein the multiple ply wood veneer article consists of a tubular body 40 and end closures 42, 44 will be considered. The tubular body 40 is cylindrical in configuration and has an outer ply 46 and an inner ply 48. The plies 46, 48 have their grains oriented generally parallel and the seams preferably in nonaligned relationship. While closures 42, 44 may be of any variety suitable for the purpose, in the form illustrated these closures consist of laminated wooden veneer members manufactured in accordance with the practice of the present invention with successive plies having their surfaces bonded in surface to surface adjacency with respect to each other. The wood veneer plies of each closure 42, 44 preferably have grain orientations of the plies oriented within about 20° of each other. This facilitates resistance to warpage and more uniform thermal expansion and contraction. In the form of closure shown, stopper-like friction fit is contemplated with ease of reclosure being permitted. Containers of this type could be used for a wide variety of articles including an outer container for liquid materials such as toiletries, cosmetics and the like having an inner bottle or tubular container. The natural aesthetic beauty of wood may be employed with great advantage in such containers.

Figure 5:
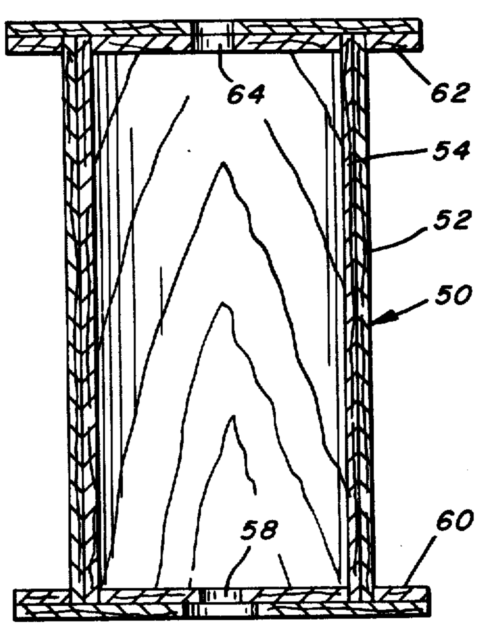
FIG. 5 is a vertical cross sectional illustration of another form of container of the present invention.

Referring now to FIG. 5, yet another embodiment of the invention will be considered. FIG. 5 illustrates a tubular multiple ply wood veneer article of this invention adapted to be employed in a lamp base. In the form illustrated, the tubular body 50 consists of an outer ply 52 adhesively bonded to an inner wood veneer ply 54. In plan, the tubular body may assume any desired configuration. In the form shown, the tubular body is provided with lower closure 60 which is permanently secured to the tubular body 50 by means of an adhesive (not shown) and an upper closure 62 which is in tight friction fit engagement with the tubular body. Closure 60 has an opening 58 aligned with opening 64 of closure 62. These openings are adapted to receive a metal tube (not shown) through which an electrical wire (not shown) may pass and connect a source of electrical energy with a lamp socket positioned above closure 62. In the form illustrated, both closures 60, 62 are of veneer construction, but it will be appreciated that a wide range of closure designs and materials including solid wood may be employed in combination with the tubular body in advantageous fashion.

For purposes of simplicity of illustration herein, reference has been made to multiple ply wood veneer tubular articles of a generally cylindrical configuration, but it will be appreciated that as a result of the grain orientation and other aspects of the present invention which facilitate ready forming of the veneer into a variety of shapes, a number of configurations such as tubes which are of oval, rectangular, polygonal or other regular or irregular configurations may be provided. By way of illustrative example, reference is now made to FIG. 6 wherein a plan view of a two layer wood veneer article is illustrated. This article has an outer ply 70 and an inner ply 72 secured in intimate surface to surface adjacency by means of an adhesive (not shown in this view). The outer ply 70 has a seam 74 which is in relative nonaligned position with respect to seam 76 of the inner ply.

FIG. 7 illustrates a humidor made in accordance with the present invention. The lateral wall 80 is composed of plies 82, 84, 86. A layer of aluminum foil 88 is adhesively bonded to inner wood veneer ply 86 to enhance the moisture barrier properties of the humidor. Also present within the humidor is a sponge 90 which serves as a reservoir for moisture. The upper and lower closures 92, 94 are composed of multi-ply wood veneer and are secured within notches in lateral wall 80. An irregular cut 96 about the periphery of lateral wall 80 permits the humidor to be opened by means of knob 98 and subsequently reseated.

Referring now to FIGS. 8 and 9, there is shown a tube composed of two layers of veneer and having an upper opening $D_1$ of smaller diameter than lower opening $D_2$. The outer wall is composed of veneer sectors 100, 102, 104 which meet at seams 106, 108, 110, respectively. Inner plies 112, 114, 116 are in surface to surface adjacency with respect to adjacent outer plies and have grain orientations generally parallel to the grain orientations of outer plies 100, 102, 104. Seams 118, 120, 122 are disposed in nonaligned position with respect to seams 106, 108, 110.

While for purposes of clarity and simplicity of illustration herein exemplary reference has been made to multiple ply wood veneer articles having two and three plies, it will be appreciated that the invention is applicable to structures having a great number of plies above and beyond two or three. The practice of the invention in connection with such larger numbers is essentially the same as has been described above.

While for convenience of illustration the specific examples shown herein have grain orientations generally aligned with the longitudinal axis of the tube, it will be appreciated that grain orientations may be provided in other directions. For example, the grains may be oriented perpendicular or transverse to such axis. The relative grain positions of a given ply with respect to other plies is of great importance, but the relative orientation of the grains of the assembly of plies with respect to the article is of lesser importance.

While for purposes of illustration the preferred generally nonaligned position of seams of adjacent veneer layers has been illustrated, it will be appreciated that for certain uses aligned seams may be desired and such constructions are within the scope of the present invention.

It will therefore be appreciated that the present invention provides a multiple ply wood veneer tubular article which permits the economic reliable reproducible precise fabrication of a wide range of tubular configurations which, as a result of the generally parallel relationship of the grains, permits even severe forming of each veneer ply without undue risk of fracture or departure from the desired configuration. As a result of the intimate bond established by the preferably substantially continuous adhesive and the preferably nonaligned seam relationship, the tubular article is adapted to serve in many environments as a tube per se or as a component in a container-like article. While for purposes of simplicity of illustration reference has been made herein to several specific types of end uses, it will be appreciated that numerous other end uses may be provided. The result regardless of end use environments is that the natural beauty of the wood veneer combined with the composite construction provides for not only desirable aesthetic characteristics and economic manufacture, but also eliminates problems inherent in some of the prior configurations such as difficulty in forming and warpage.

Whereas particular embodiments of the invention have been described above for purposes of illustration, it will be evident to those skilled in the art that numerous variations of the details may be made without departing from the invention as defined in the appended claims.

I claim:

1. A method of manufacturing a multiple ply wood article comprising providing a first wood veneer ply and a second wood veneer ply, immersing said wood veneer plies in water at a temperature above about 200°F for a period sufficient to increase the flexibility of said plies, removing said plies from said elevated temperature water, forming a first wood veneer ply into a generally tubular shape with a pair of confronting ends and having a grain oriented generally in a first direction, forming a second wood veneer ply into a generally tubular shape generally similar to the shape of said first wood veneer ply with a pair of confronting ends and having its grain oriented generally in said first direction, applying adhesive means to at least one of the exterior surface of said first wood veneer ply and the interior surface of said second wood veneer ply, placing said second wood veneer ply in exteriorly disposed surface to surface adjacency with respect to said first wood veneer ply with the grain orientations of said first and second wood veneer plies being generally parallel, and securing said wood veneer plies in such relative position to establish a tubular article.

2. The method of manufacturing a multiple ply composite wood article of claim 1 including said grains being oriented generally longitudinally with respect to the longitudinal axis of said tubular article.

3. The method of manufacturing a multiple ply composite wood article of claim 1 including the confronting ends of one said ply being generally nonaligned with respect to the confronting ends of said other wood veneer ply.

4. The method of manufacturing the multiple ply composite wood article of claim 1 including after completion of manufacture of said tubular article, securing a closure element to at least one end thereof.

5. The method of manufacturing the multiple ply composite wood article of claim 1 including the orientation of said wood grains on said wood veneer plies having an included angle of less than about 20°.

6. The method of manufacturing the multiple ply composite wood article of claim 1 including after forming said first and second wood veneer plies forming at least one additional wood veneer ply having a generally tubular shape, a configuration generally the same as said first and second wood veneer plies with a pair of confronting ends and a grain oriented generally in said first direction, and positioning each said additional wood veneer ply over the next preceding exteriorly disposed wood veneer ply in surface adjacency with respect thereto and adhesively securing the same in such position.

7. The method of manufacturing the multiple ply composite wood article of claim 1 including providing closures at or adjacent each end of said tubular article with at least one said closure being readily removable and reapplied thereto.

8. The method of manufacturing multiple ply composite wood article of claim 1 including prior to forming said wood veneer plies into said generally tubular shape, immersing said plies in water at about 200° to 250°F for about 1 to 10 minutes.

9. The method of manufacturing the multiple ply composite wood article of claim 1 including providing said wood veneer plies in a thickness of about 1/32 to 5/16 inch, and creating said generally tubular shape by wrapping each said ply under the influence of tension and heat around a form member.

10. The method of manufacturing the multiple ply composite wood article of claim 9 including securing said plies around said form members for a sufficient period of time to restore the moisture content of said plies generally to the level which existed prior to said immersion.

* * * * *

UNITED STATES PATENT AND TRADEMARK OFFICE

CERTIFICATE OF CORRECTION

PATENT NO. : 3,963,546

DATED : June 15, 1976

INVENTOR(S) : Barney Roberti

It is certified that error appears in the above-identified patent and that said Letters Patent are hereby corrected as shown below:

| | |
|---|---|
| Cover page, item (22) | Change "Filed: March 25, 1976" to --Filed: March 25, 1975-- |
| Column 2, line 64 | Immediately prior to "FIG. 7", begin a new paragraph |
| Column 4, line 29 | Change "θ" to --1/4-- |
| Column 8, line 21 | Before "adjacency" insert -- -to-surface -- |

Signed and Sealed this

Ninth Day of November 1976

[SEAL]

*Attest:*

RUTH C. MASON
*Attesting Officer*

C. MARSHALL DANN
*Commissioner of Patents and Trademarks*